US006978238B2

(12) United States Patent
Wohlsen et al.

(10) Patent No.: US 6,978,238 B2
(45) Date of Patent: Dec. 20, 2005

(54) METHOD AND SYSTEM FOR IDENTIFYING A USER BY VOICE

(75) Inventors: Robert C Wohlsen, Menlo Park, CA (US); Sue McNeill, Mendocino, CA (US)

(73) Assignee: Charles Schwab & Co., Inc.

(*) Notice: Subject to any disclaimer, the term of this patent is extended or adjusted under 35 U.S.C. 154(b) by 583 days.

(21) Appl. No.: 09/351,723

(22) Filed: Jul. 12, 1999

(65) Prior Publication Data
US 2003/0125944 A1 Jul. 3, 2003

(51) Int. Cl.[7] ............................................. G10L 17/00
(52) U.S. Cl. ..................................... 704/246; 704/273
(58) Field of Search ............................... 704/246–250, 704/273

(56) References Cited

U.S. PATENT DOCUMENTS

| | | | | |
|---|---|---|---|---|
| 3,752,904 A | * | 8/1973 | Waterbury | 348/13 |
| 3,896,266 A | * | 7/1975 | Waterbury | 235/380 |
| 5,752,231 A | * | 5/1998 | Gammel et al. | 704/200 |
| 5,774,525 A | * | 6/1998 | Kanevsky et al. | 379/88.02 |
| 5,897,616 A | * | 4/1999 | Kanevsky et al. | 704/246 |
| 5,913,196 A | * | 6/1999 | Talmor et al. | 704/270 |
| 6,246,988 B1 | * | 6/2001 | Schier | 704/270 |
| 6,266,640 B1 | * | 7/2001 | Fromm | 235/380 |

OTHER PUBLICATIONS

Webb, J.J. et al.; Speaker Identification Experiments Using HMMs; 1993, IEEE International Conference on, vol. 2, pp. 131-134.*

* cited by examiner

Primary Examiner—Abul K. Azad
(74) Attorney, Agent, or Firm—Innovation Partners; Charles E. Gotlieb

(57) ABSTRACT

A method and apparatus identifies a caller as a user in a group of users. An enrollment process extracts a grammar of the user's password and a voiceprint of the user's password and name. A caller may identify himself as a user by speaking his name. The name is recognized and a number of users having a name most closely matching the name spoken is identified using voice recognition techniques. The caller then speaks his password and the grammar is identified that most closely matches the grammars of the passwords corresponding to the users identified from the spoken name. A voiceprint is extracted from the name and grammar spoken by the caller, and if the voiceprint matches the voiceprint extracted for the user identified using the grammar during that user's enrollment process, the caller is identified as that user.

21 Claims, 4 Drawing Sheets

METHOD AND SYSTEM FOR IDENTIFYING A USER BY VOICE

FIELD OF THE INVENTION

The present invention is related to computer software and more specifically to computer software for voice recognition.

BACKGROUND OF THE INVENTION

In order to identify a user to a computer system, voice recognition software may be used. A user may speak one or more forms of identification to the voice recognition software, and the voice recognition software attempts to identify the user using what was said to the voice recognition software. The system also attempts to validate the identification using unique characteristics of the user's voice that have previously been identified during a "enrollment" procedure. The enrollment procedure enrolls the unique characteristics of the person's voice at a time when the person has been positively identified using means other than voice, such as visual identification or a PIN number.

One approach described in U.S. Pat. No. 5,517,558 issued to Schalk is illustrative. A user speaks, one character at a time, a password in response to a prompt. The password must be spoken one character at a time because single character recognition can be more accurate than whole word recognition for reasons such as the limited number of single characters. The system uses speaker-independent voice recognition techniques to recognize the characters spoken as a password. During this identification process, the system also extracts parameters from the password spoken that identify the unique details of the user's voice. These parameters extracted during the identification process are matched against parameters previously extracted during an enrollment process for the user having the password recognized.

If the two sets of parameters match relatively closely, there is a high probability that the user is the user identified. If the two sets of parameters have little in common, the user may be rejected, and if the two parameters are in between a close match and little in common, Schalk prompts for additional information, also to be spoken one character at a time. Speaker independent techniques are used to recognize the additional information, and a match is attempted against additional information stored for the user to validate the identity of the user. However, in the preferred embodiment, Schalk always prompts the user for the additional string and uses speaker independent voice recognition techniques to confirm the identity of the individual by matching the second string to corresponding information stored for the user.

There are several problems with this approach. First, each password in the system must be unique because the password is used to uniquely locate the characteristics of the person's voice. To enforce the rule that all passwords are unique, passwords must be assigned rather than chosen, or some users will not get their first password choice and must select another password. In such systems, users who cannot use their first choice as a password tend to forget their passwords more often than a system in which every user can use their own first choice password, even if such password is already being used by another user. Second, the Schalk system requires passwords to be spoken one character at a time. Users may find such a system unnatural to use.

What is needed is a method and apparatus that can identify a user without requiring that all passwords be unique or spoken one character at a time.

SUMMARY OF INVENTION

A method and system allows users to enroll by speaking their name and password. A grammar is extracted from the name and password that identifies how the user speaks the name and password. A voiceprint is extracted from the name and password that identifies characteristics of the user's voice. The user's account can be marked as having been enrolled, and the voiceprint and grammar are stored associated with the user's account identifier. When a caller wishes to identify himself as a user, he is prompted for his name and password, and speaks his name and password. The method and system uses conventional voice recognition on the name to narrow the list of possible users from those who have enrolled to a smaller number of users most closely matching the recognized name. The method and system extracts the grammar from the caller's password and attempts to match the grammar against the grammars associated with the smaller number of users to identify an even smaller number of users or as few as one user. The method and system extracts a voiceprint from the name and grammar and matches the voiceprint extracted with the voiceprints of the smaller number of users obtained during the enrollment process. The match is performed either to narrow the identity of the caller from the smaller number of users to a single user, or to verify the identity of the single user whose grammar of the password matches that of the caller.

DETAILED DESCRIPTION OF A PREFERRED EMBODIMENT

Figure 1:
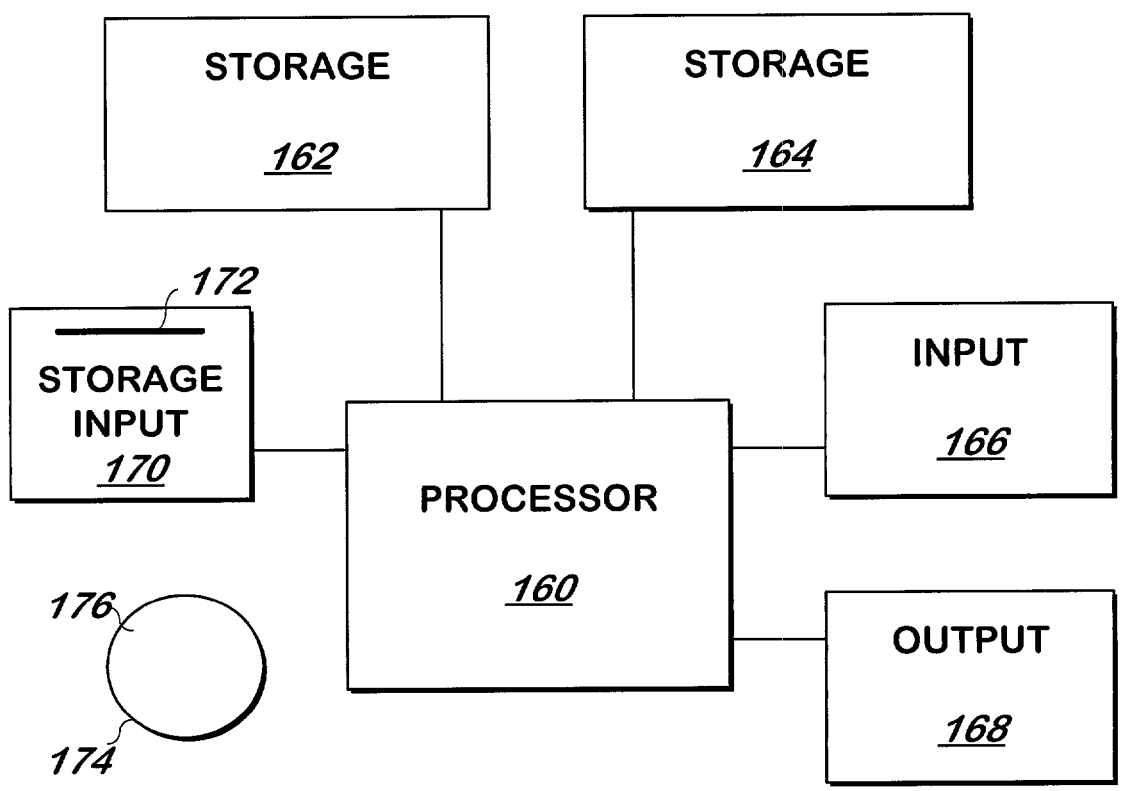
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, multiple computer systems 150 are used to implement the present invention. A conventional mainframe computer such as a conventional S/390 computer system commercially available from IBM Corporation of Armonk, N.Y. may be coupled to one or more conventional Sun Microsystems Ultra Sparc computer systems running the Solaris 2.5.1 operating system commercially available from Sun Microsystems of Mountain View, Calif., although other systems may be used. A VPS recognizer commercially available from Periphonics Corporation of Bohemia, N.Y. and any of Nuance 6, Nuance Verifier, Nuance Developer's ToolKit and Speech Objects software commercially available from Nuance Communications of Menlo Park, Calif. are used with the Ultra Sparc computer to perform certain recognition functions.

System—Enrollment

Figure 2:
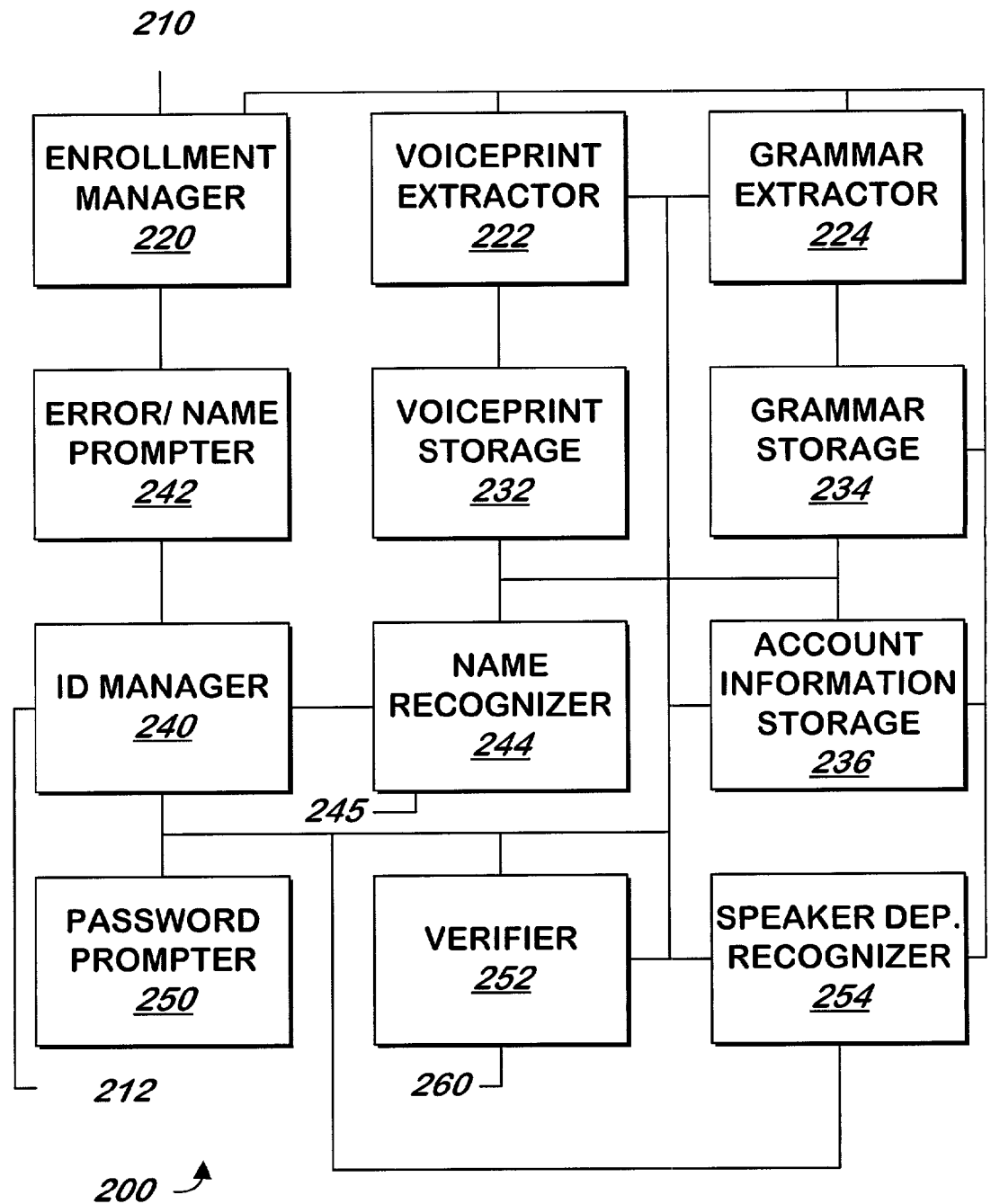
FIG. 2 is a block schematic diagram of a system for identifying a person to a computer according to one embodiment of the present invention.

Referring now to FIG. 2 a system 200 for identifying a person to a computer is shown according to one embodiment of the present invention. In one embodiment, a user enrolls with the system 200 during one session, then identifies himself to the system 200 during the same or different session (between sessions, the user may be disconnected from the system 200). To enroll with the system, a user is vocally connected with enrollment manager 220 at input 210. Input 210 may be reached by dialing it or via a studio or transfer from an operator who receives the caller and verifies the callers identity. If the caller dialed in, enrollment manager 220 may validate the identity of the caller by prompting for one or more forms of identification, such as an account number and PIN. This information may be spoken or keyed in using touch tones or other input methods. Enrollment manager 220 stores this information internally for use as described below.

To validate the identity of the caller, enrollment manager 220 can request from a account information storage 236 which may be a conventional personal computer, minicomputer or mainframe computer, the corresponding identification for the user. For example, enrollment manager 220 can request from account information storage 236 the PIN corresponding to the account number received from the user. Enrollment manager 220 can verify the identity of the user by comparing the PIN received from account information storage 236 with the PIN received from the user. If enrollment manager 220 verifies the identity of the user, enrollment manager 220 prompts the user to separately speak his name and password in one embodiment.

Although a name and password are used herein in one embodiment, other forms of identification may be used, and a larger or smaller number of forms of identification may also be used in other embodiments.

In one embodiment, enrollment manager 220 passes the name and password spoken by the user to voiceprint extractor 222 for use as described below, and passes the name and password to grammar extractor 224 for use as described below. In another embodiment, enrollment manager 220 passes only the password to grammar extractor 224.

Voiceprint extractor 222 receives the spoken name and password from enrollment manager 220 and can receive other spoken information as well. For example, in one embodiment, enrollment manager 220 prompts each user to speak the same phrase, such as "My voice is my password" and provides the response to voiceprint extractor 222 to for extraction. Voiceprint extractor 222 uses conventional speaker verification modeling techniques to extract one or more characteristics and/or patterns of the user's voice that can uniquely identify the user from the general population or at least discriminate a user from at least approximately 99.5% of the general population with near zero false acceptances and near zero false rejections.

Voiceprint extractor 222 stores in voiceprint storage 232 the voiceprint, extracted as described above. In one embodiment, voiceprint extractor 222 receives from enrollment manager 220 the account number or other identifier of the user. Voiceprint extractor 222 stores the voiceprint associated with the account number or other identifier of the user whose voice the voiceprint describes. This may be performed using a database or by storing each voiceprint in a separate file with a filename equal to the account number or using any other conventional technique.

Grammar extractor 224 receives the user's spoken password from enrollment manager 220, and extracts a grammar from the password. Grammars are a description of the sounds and transitions between them and order of the sounds that form a word or words. In one embodiment, a grammar is similar to a dictionary pronunciation of a word, which describes the elemental sounds that make up the word, and provides an indication of emphasis, implying loudness and pitch relative to the rest of the word. If grammar extractor 224 receives the name from enrollment manager 220, grammar extractor 224 extracts a grammar from the name.

Grammar extractor 224 stores the grammar of the user's spoken password in grammar storage 234. In one embodiment, grammar extractor 224 receives the user's account number or other identifier from enrollment manager 220, and associates the grammar or grammars it stores in grammar storage 234 with the account number or other identifier as described above with reference to voiceprint extractor 222. This may be accomplished using conventional database techniques or other conventional techniques.

If grammar extractor 224 receives the user's name, grammar extractor 224 repeats the process above on the name, storing the grammar of the name in grammar storage 234.

In one embodiment, when voiceprint extractor 222 and grammar extractor 224 complete the process described above, the signal enrollment manager 220. Enrollment manager 220 marks in account information storage 236 the name of any user that successfully completes the enrollment procedure described above so that the recognition process described below need only attempt to recognize those names of people who have enrolled.

If desired, the prompting process described above for the name, password or both may be repeated a number of times such as three, and the responses received used to refine the extraction of the voiceprint, grammar or both. Other information may also be prompted for and received to refine the extraction described above.

System—Identification

When a user wishes to be identified using his voice, the user connects to ID manager 240 via input/output 212. Input/output 212 may be a conventional dial-up telephone line. ID manager 240 contains a conventional telephone interface, although other means of interface such as an Internet telephony interface may be used.

When ID manager 240 receives a call, ID Manager 240 signals error/name prompter 242 which prompts the caller to speak his or her name via input/output 212. ID manager 240 listens for a response and passes voice responses to name recognizer 244 and to voiceprint extractor 222. ID manager 240 may pass any responses in analog or digital form and may pass the response in real time or after recording them.

Before the name is spoken, the caller's account number could be any of the valid accounts corresponding to those people who have enrolled. Name recognizer 244 uses conventional voice recognition techniques attempts to narrow the possible accounts corresponding to the name spoken down to a smaller number of accounts than all of the accounts of people who have enrolled, but greater than one account. For example, name recognizer 244 can attempt to narrow the list down to ten accounts or even a hundred, which may be smaller than the number of valid, enrolled accounts, which may number in the thousands, tens of thousands, hundreds of thousands or millions.

Name recognizer 244 can use any of speaker dependent or speaker independent techniques to try to identify the several accounts that potentially correspond to the name it receives. For example, it can send the name to grammar extractor 224 to extract the grammar of the name received and then try to find in grammar storage 234 the nearest matches of grammars of the people who have spoken their names. Alternatively, name recognizer 244 can attempt to use speaker independent voice recognition techniques to narrow the list of possible accounts down to a smaller number. Each of these techniques will now be described in more detail.

In one embodiment, name recognizer 244 sends to grammar extractor 224 the name it receives from ID manager 240. Grammar extractor 224 extracts the grammar from the spoken name received from name recognizer 244 and passes it back to name recognizer 244. Name recognizer 244 attempts to locate in grammar storage 234 using conventional pattern matching techniques the N best matches between the grammar it receives from grammar extractor 224 and the grammars for the names that were extracted during the enrollment procedure for each user as described above. N may be 10 or 100 or any other number.

In an alternate embodiment name recognizer 244 uses the text of the names of all enrolled users that are stored in account information storage 236 to perform the recognition using conventional speaker independent speech recognition techniques. Name recognizer 244 attempts to resolve the name into a sequence of primitive sounds, then identifies possible spellings of those sounds. In one embodiment, name recognizer 244 locates from among the names marked as enrolled the N best matches with the name spoken by the caller in response to the prompt by comparing the possible spellings with the actual spellings of the names of the enrolled users stored in account information storage 236. A similar technique may be performed by having name recognizer 244 identify and store the primitive sounds of the name of each enrolled account stored in account information storage and store this information in account information storage 236 for comparison with the primitive sounds received. Other speaker independent techniques may also be used.

Speaker independent recognition may make use of utterance information spoken by a wide variety of people using a wide variety of accents and voices via input 245. Name recognizer 244 uses this information to identify each primitive sound using conventional techniques.

Another speaker independent technique is to have name recognizer 244 compare the name received to a vocabulary of known names. The feasibility of this technique will depend on the number of possible names. As noted above, the names may be replaced with other words for which a vocabulary may be more feasible.

In one embodiment, N may be 10, in another embodiment, N may be 100, and N may be other numbers in still other embodiments. In an alternative embodiment, instead of requiring N matches to occur, a confidence level is selected, and name recognizer 244 locates all matches exceeding the confidence level. In any of the embodiments, the names corresponding to more than one account are identified as a potential match for the name that is spoken in response to the prompt. In one embodiment, name recognizer 244 indicates the account names that are potential matches by marking in account information storage 236 the account records corresponding to the names it identifies.

Name recognizer 244 signals ID manager 240 when it has performed the functions identified above. ID manager 240 signals password prompter 250, which prompts the user for his or her password via input/output 212. ID manager 240 passes any responses to grammar extractor 224 and to voiceprint extractor 222, and signals speaker dependent recognizer 254.

Grammar extractor 224 extracts the grammar from the response to the password prompt and stores it in a special location in grammar storage 234. Speaker dependent recognizer 254 compares the grammar in the special location of grammar storage 234 with each of the grammars corresponding to the accounts marked in account information storage 236 by name recognizer 244 as described above. Speaker dependent recognizer 254 identifies the closest match between the grammar in the special location and the grammars corresponding to the marked accounts and passes an identifier of the account to ID manager 240. Because grammar extractor 224 extracts the grammar of the word, which describes how the word is spoken, it does not need to recognize the word. Thus, the name and/or password need not be a real word.

As shown and described herein, grammar extractor 224 is used for both the enrollment process and the identification process. However, different grammar extractors could be used for each process.

Because ID manager 240 passes the name and password to voiceprint extractor 222, simultaneously with the operation of the name recognizer 244 and speaker dependent recognizer 254 and the ancillary activities (prompting, grammar extracting, etc.) described herein, voiceprint extractor 222 extracts a voiceprint for the caller as described above, and stores the voiceprint so extracted in a special location of voiceprint storage 232.

ID manager 240 passes the identifier it receives from speaker dependent recognizer 254 to verifier 252. Verifier 252 receives from ID manager 240 the identifier of the account ID manager 240 received from speaker dependent recognizer 254, and verifies the identity of the caller by attempting to match some or all of the voiceprint extracted from the caller at input 212 with the voiceprint stored in voiceprint storage 232 for the account having the identifier verifier 252 receives from ID manager 240. If the portion or all of the voiceprints match or nearly match within an acceptable tolerance level, verifier 252 provides the identifier of the account at output 260 to identify the caller. If the voiceprints do not match, verifier 252 signals ID manager 240. The acceptable tolerance level can vary based on the application and the amount information collected from the person's voice, and can be set based on experience. In one embodiment, the confidence level will range from +1, indicating a highly probable match to −1 indicating no match. The acceptable confidence level is +0.7 in one embodiment, although other values such as 0.6, 0.5, 0.8 and 0.9 may be used.

As shown and described herein, the same voiceprint extractor 222 is used for both the enrollment of the user and the verification of the user. However, different voiceprint extractors (not shown) may be used for each of these functions.

In the event of an error, ID manager signals error/name prompter 242. An error occurs if name recognizer 244 does not match any names (and therefore signals ID manager 240), speaker dependent recognizer 254 does not match any grammars (and therefore signals ID manager 240), or verifier 252 does not match the voiceprints (and therefore signals ID manager 240), each as described above. Error/name prompter 242 informs the caller of the error and restarts the procedure above by prompting for the name.

Figure 3A:
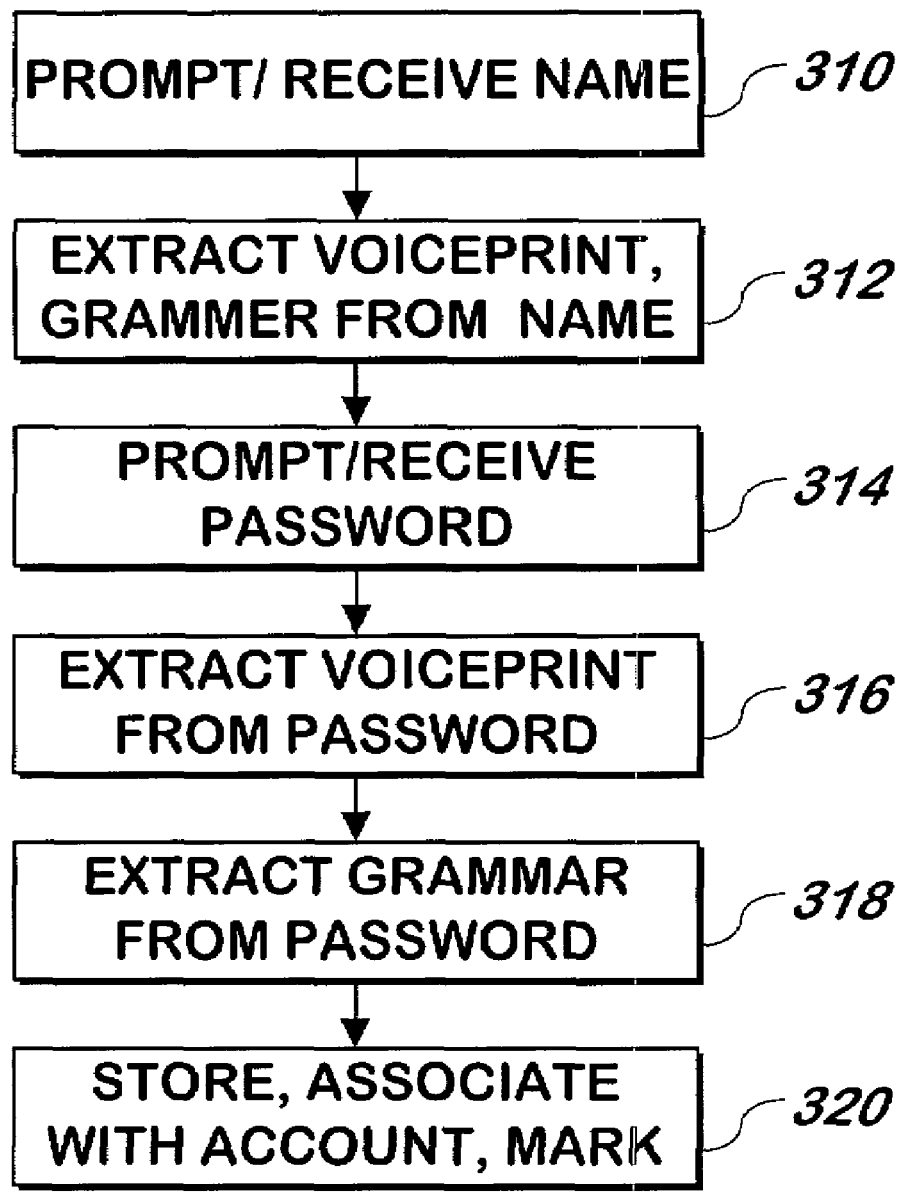
FIG. 3A is a flowchart illustrating a method of a method of enrolling a person to a computer according to one embodiment of the present invention.

Referring now to FIG. 3A, a method of enrolling a person to a computer is shown according to one embodiment of the present invention. A user is prompted for a name and an utterance that is a name is received 310 as described above. A voiceprint is extracted from the name and optionally a grammar or other description of the spoken attributes of the name may be extracted 312 as described above.

The user is prompted for his or her password and an utterance containing the password is received 314 as described above. The voiceprint and grammar are extracted from the password 316, 318 as described above. The information extracted in steps 312, 316, and 318 is stored, associated with the account number or other identifier of the user 320. The user's account may be marked 320 as having successfully completed enrollment so that recognition may be attempted only on those accounts that are so marked as described in more detail above and below.

The voiceprint described in steps 312 and 316 may be extracted and refined in these steps, and the caller may be prompted for the same or other information, which may be used to further refine the voiceprint. For example, the caller may be prompted for his or her name repeatedly in steps 310 and receipt of multiple copies of the name may be used in the extraction of step 312. The password may also be repeatedly prompted in step 314 and each response used in steps 316, 318.

Figure 3B:
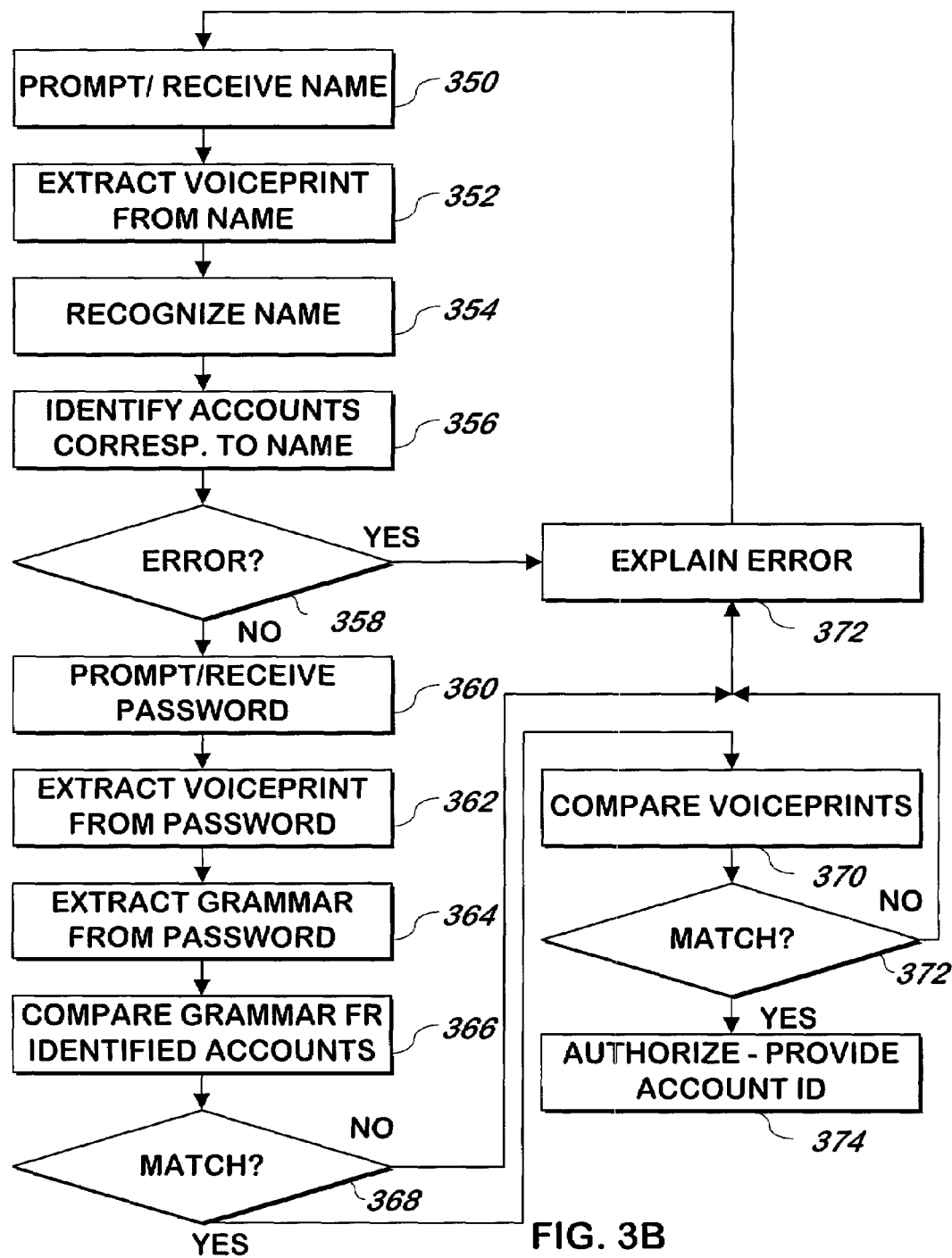
FIG. 3B is a flowchart illustrating a method of identifying a caller as a user according to one embodiment of the present invention.

Referring now to FIG. 3B, a method of identifying a caller as a user is shown according to one embodiment of the present invention. The caller is prompted for his or her name and an utterance that is supposed to be the name is received 350 in response as described above. In one embodiment, step 350 includes distinguishing the name from background noise, coughs, static or other sounds that are not words by using conventional speech recognition techniques. A voiceprint is extracted 352 from the name received in step 350. In addition, the name received in step 350 is recognized 354 using speaker independent or speaker dependent techniques as described above to identify 356 the best N matches, where N is greater than one. N may be ten or 100 or any other number that is smaller than either the number of accounts or the number of accounts that were marked as having completed enrollment as described above. In one embodiment, the recognition is attempted only for those accounts that were so marked, and other accounts are skipped during the recognition step 354. Step 356 may comprise marking the accounts of the identified users.

If no accounts are identified or none are identified where the recognition exceeds a specified confidence level, an error occurs 358, the error may be explained 372 to the user via an error prompt and the method continues at step 372. If desired, an error counter may be set to zero in a step (not shown) preceding step 350 and incremented at step 372. When the error count reaches a specified threshold, the caller is transferred to an operator or dropped. If no error occurs 358, the method continues at step 360.

The caller is prompted for a password, and the password is received 360 as described above. Additional voiceprint information is extracted 362 from the password received in step 360 and this additional voiceprint information is added to, or used to refine, the voiceprint extracted in step 352 as described above.

The grammar is extracted 364 from the password received in step 360 as described above. The grammar extracted in step 364 is compared with the grammars extracted as described above with reference to FIG. 3A and the best match 366 with a single account from among those identified in step 356. Step 366 may be performed by picking the closest match, above a specified confidence level (e.g. 95% match) to the grammar extracted in step 364.

If such a match is not located 368, the method continues at step 372 to allow a suitable error message to be played to the caller and the method may continue at step 350 in one embodiment, or at step 360 in another embodiment not shown. If the method continues at step 350, the accounts identified in step 356 have the identification removed (e.g. by removing the mark set in step 356 described above). If a match is located, 368, a verification occurs as shown in steps 370–374 described below.

The voiceprint of the account identified as a match in step 366 is compared 370 with the voiceprint produced in steps 352 and 362. The voiceprint of the account was produced as described above with reference to FIG. 3A. If the voiceprints match 372, the account ID is provided 374 or another indication of authorization is provided in step 374. Otherwise, the method continues at step 372 in the same manner as described above, with an indication of the error, and continuing at step 350 or 360.

In one embodiment not shown, if the "no" branch of step 372 is taken, an error counter flag initialized to a value of 0 in a step (not shown) prior to step 350 is incremented at step 372. If the counter is equal to 1, the method continues at step 360. If the counter is equal to 2, the method continues at step 372. If the counter is equal to 3, the method continues by transferring the caller to an operator, and optionally, the account matched in step 366 may be locked from further use.

In an alternate embodiment of the present invention, instead of narrowing the list of users down to a single user when the grammars are compared in step 366, and then verifying the identity,of the user by comparing the voiceprints, the list of users may be a small number, e.g. 5 after the grammars are compared in step 366, and the voiceprint comparison of step 370 may be used to select the identity of the user from this small number of users.

What is claimed is:

1. A method of obtaining a user's identity by voice, comprising:

receiving a set of at least one known grammar and a set of at least one known voiceprint corresponding to a plurality of utterances from each of a first plurality of users;

for each of the first plurality of users, associating the set of at least one known grammar and the set of at least one known voiceprint with an identifier of said user;

receiving at least one utterance from a subject user;

performing a voice recognition on at least one of the at least one utterance received from the subject user, said voice recognition being different from extracting a grammar from a first at least one of the at least one utterance received from the subject user;

responsive to the voice recognition technique, selecting from the first plurality of users a second plurality of users, smaller than the first plurality of users by a factor of at least ten, for which the first voice recognition most closely matches at least one selected from the set of at least one grammar and the set of at least one voiceprint associated with the identifiers of the second plurality of users;

from the second plurality of users, selecting the user for which a grammar of the first at least one of the at least one utterance received from the subject user most closely matches at least one of the set of at least one grammar associated with the identifiers of the second plurality of users;

verifying a voiceprint of at least one of the at least one utterance has at least a similarity to the set of at least one voiceprint of the selected user; and responsive to the verifying step, providing the identifier of the selected user as the identifier of the subject user.

2. The method of claim 1 wherein the voice recognition comprises extracting a grammar from a second at least one of the at least one utterance received from the subject user, the second at least one of the at least one utterance having at least one difference from the first at least one of the at least one utterance.

3. The method of claim 1 wherein the voice recognition technique comprises speaker independent voice recognition.

4. The method of claim 1 wherein the first at least one of the at least one utterance comprises a password.

5. The method of claim 1 wherein a number of the second plurality of users corresponds to a constant.

6. The method of claim 1 wherein the second plurality of users corresponds to users for which the voice recognition technique yields a confidence level exceeding a threshold.

7. The method of claim 1 wherein at least one of the at least one utterance may be other than a real word.

8. A system for obtaining a user's identity by voice, comprising:

storage for storing and providing at an output a set of at least one known grammar and a set of at least one known voiceprint corresponding to a plurality, of utterances from each of a first plurality of users, for each of the first plurality of users, the set of at least one known grammar and the set of at least one known voiceprint being associated with an identifier of said user;

a first recognizer having an input operatively coupled for receiving at least one utterance from a subject user, the first recognizer for performing a voice recognition on at least one of the at least one utterance received from the subject user, said voice recognition being different from extracting a grammar from a first at least one of the at least one utterance received from the subject user, the first recognizer additionally for, responsive to the voice recognition technique, selecting from the first plurality of users a second plurality of users, smaller than the first plurality of users by a factor of at least ten, for which the first voice recognition most closely matches at least one selected from the set of at least one grammar and the set of at least one voiceprint associated with the identifiers of the second plurality of users received at a second input coupled to the storage output, and for providing at an output identifiers of the second plurality of users;

a second recognizer having a first input for receiving the identifiers of the second plurality of users, and a second input for receiving at least one of the at least one utterance from the subject user, the second recognizer for extracting a grammar from the at least one of the at least one utterance received at the second second voice recognizer input, and for selecting from the second plurality of users the user for which the grammar extracted most closely matches at least one of the set of at least one grammar associated with the identifiers of the second plurality of users received at a third input coupled to the storage output, and for providing an identifier of the selected user at an output;

a verifier having a first input coupled to the second recognizer output, the verifier for obtaining a voiceprint of at least one of the at least one utterance received at a second input, and for verifying a voiceprint of at least one of the at least one utterance has at least a similarity to the set of at least one voiceprint of the selected user received at a third input coupled to the storage output; and responsive to said verification, providing at an output the identifier of the selected user as the identifier of the subject user.

9. The system of claim 8 wherein the first recognizer performs the voice recognition by extracting a grammar from a second at least one of the at least one utterance received from the subject user, the second at least one of the at least one utterance having at least one difference from the first at least one of the at least one utterance.

10. The system of claim 8 wherein the first recognizer performs the voice recognition using speaker independent voice recognition.

11. The system of claim 8 wherein the first at least one of the at least one utterance comprises a password.

12. The system of claim 8 wherein a number of the second plurality of users corresponds to a constant.

13. The system of claim 8 wherein the second plurality of users corresponds to users for which the voice recognition performed by the first recognizer yields a confidence level exceeding a threshold.

14. The system of claim 8 wherein at least one of the at least one utterance may be other than a real word.

15. A computer program product comprising a computer useable medium having computer readable program code embodied therein for obtaining a user's identity by voice, the computer program product comprising computer readable program code devices configured to cause a computer to:

receive a set of at least one known grammar and a set of at least one known voiceprint corresponding to a plurality of utterances from each of a first plurality of users;

for each of the first plurality of users, associate the set of at least one known grammar and the set of at least one known voiceprint with an identifier of said user;

receive at least one utterance from a subject user;

perform a voice recognition on at least one of the at least one utterance received from the subject user, said voice recognition being different from extracting a grammar from a first at least one of the at least one utterance received from the subject user;

responsive to the voice recognition technique, select from the first plurality of users a second plurality of users, smaller than the first plurality of users by a factor of at least ten, for which the first voice recognition most closely matches at least one selected from the set of at least one grammar and the set of at least one voiceprint associated with the identifiers of the second plurality of users;

from the second plurality of users, select the user for which a grammar of the first at least one of the at least one utterance received from the subject user most closely matches at least one of the set of at least one grammar associated with the identifiers of the second plurality of users;

verify a voiceprint of at least one of the at least one utterance has at least a similarity to the set of at least one voiceprint of the selected user; and responsive to the computer readable program code devices configured to cause the computer to verify, provide the identifier of the selected user as the identifier of the subject user.

16. The computer program product of claim 15 wherein the computer readable program code devices configured to cause the computer to perform voice recognition comprise computer readable program code devices configured to cause the computer to extract a grammar from a second at least one of the at least one utterance received from the subject user, the second at least one of the at least one utterance having at least one difference from the first at least one of the at least one utterance.

17. The computer program product of claim 15 wherein the computer readable program code devices configured to cause the computer to perform voice recognition comprise computer readable program code devices configured to cause the computer to perform speaker independent voice recognition.

18. The computer program product of claim 15 wherein the first at least one of the at least one utterance comprises a password.

19. The computer program product of claim 15 wherein a number of the second plurality of users corresponds to a constant.

20. The computer program product of claim 15 wherein the second plurality of users corresponds to users for which the voice recognition technique yields a confidence level exceeding a threshold.

21. The computer program product of claim 15 wherein at least one of the at least one utterance may be other than a real word.

* * * * *